US007607237B2

(12) United States Patent  (10) Patent No.: US 7,607,237 B2
Schafer  (45) Date of Patent: Oct. 27, 2009

(54) NUT AND BOLT SIZING TOOL

(76) Inventor: Douglas Wayne Schafer, 15 Patrick Street, Aitkenvale, Townsville (AU) 4810

( * ) Notice: Subject to any disclaimer, the term of this patent is extended or adjusted under 35 U.S.C. 154(b) by 370 days.

(21) Appl. No.: 11/730,774

(22) Filed: Apr. 4, 2007

(65) Prior Publication Data

US 2008/0276475 A1  Nov. 13, 2008

(30) Foreign Application Priority Data

Apr. 18, 2006 (AU) .............................. 2006201597

(51) Int. Cl.
*G01B 3/38* (2006.01)
(52) U.S. Cl. ......................... 33/501.45; 33/562; 7/119
(58) Field of Classification Search ............... 33/199 R, 33/201, 501.05, 501.08, 501, 45, 555.1, 555.3, 33/562; 7/118, 119, 120; 30/143
See application file for complete search history.

(56) References Cited

U.S. PATENT DOCUMENTS

| 36,333 | A | | 9/1862 | Brinkerhoff | |
|---|---|---|---|---|---|
| 3,218,724 | A | * | 11/1965 | Schaumberger | ........... 33/199 R |
| 3,858,325 | A | * | 1/1975 | Goerler | ..................... 33/199 R |
| 4,138,820 | A | * | 2/1979 | O'Connor | ..................... 33/562 |
| 4,283,858 | A | * | 8/1981 | Sobczak | ....................... 33/562 |
| D319,404 | S | | 8/1991 | Jackson, Sr. | |
| 5,131,162 | A | * | 7/1992 | Miller | ......................... 33/562 |
| 5,471,757 | A | * | 12/1995 | McDonald | ............... 33/501.45 |
| 5,617,644 | A | * | 4/1997 | Bonelli | ...................... 33/555.2 |
| 5,665,973 | A | * | 9/1997 | Christenson | ............. 250/484.2 |
| 5,875,558 | A | | 3/1999 | Bakke et al. | |
| 6,047,606 | A | * | 4/2000 | Sibole | ...................... 33/501.08 |
| 6,279,241 | B1 | * | 8/2001 | Chen | ........................ 33/501.45 |
| 6,931,744 | B1 | * | 8/2005 | Ikerd et al. | ............... 33/501.45 |
| 2004/0200084 | A1 | * | 10/2004 | Wang | ....................... 33/501.45 |
| 2008/0229598 | A1 | * | 9/2008 | Liu | ............................. 33/562 |

FOREIGN PATENT DOCUMENTS

AU   A-24233/84   2/1984

* cited by examiner

*Primary Examiner*—G. Bradley Bennett
(74) *Attorney, Agent, or Firm*—Hoffman, Wasson & Gitler, P.C.

(57) ABSTRACT

A tool for nut or bolt sizing, the tool comprising a plurality of relatively thin finger members, at least some of the finger members being provided with a measuring slot or notch which can be used to determine the size of the nut or bolt, and identification means being provided such that the size of the slot or notch can be quite readily determined, the finger members able to move between a first position where the finger members substantially overlie each other and are at least partially restrained into the first position, and a second position where a finger member can be moved to a position where it can be used to size a nut or bolt.

11 Claims, 3 Drawing Sheets

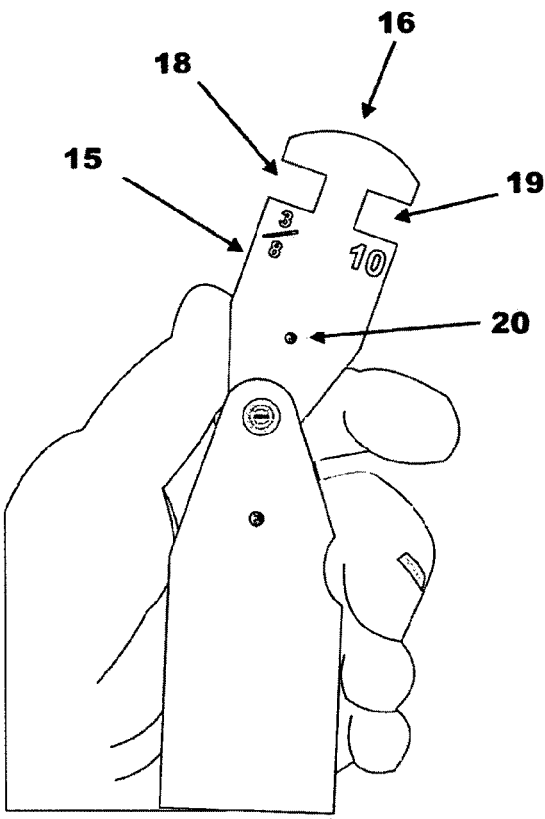
FIG 3
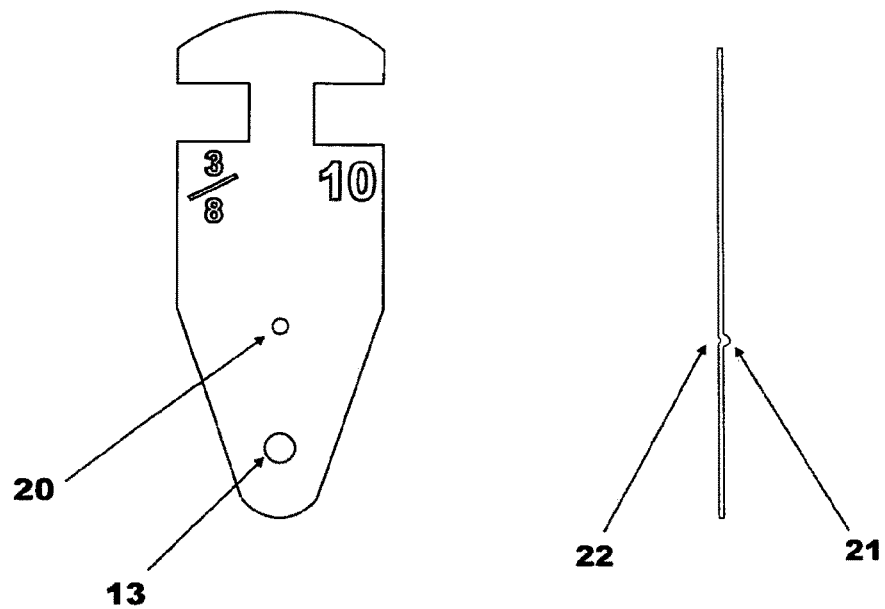
FIG 4
FIG 5

NUT AND BOLT SIZING TOOL

FIELD OF THE INVENTION

This invention is directed to a small portable handy gauge that can be used to find the correct size of a nut or bolt such that the correct spanner can be used. The invention is also directed to a gauge of particular construction to prevent tangling of the various gauge members.

BACKGROUND OF THE INVENTION

When tightening or loosening bolts or nuts, it is necessary to have the correctly sized spanner and the like. Using a spanner that is even slightly larger than the nut or bolt can result in damage to the fastener which is highly undesirable.

Adjustable spanners are, of course, well known, but because of their large head size, there will be many situations where an adjustable spanner cannot be used due to space constraints and the like.

Nuts and bolts do not have any indication of their size given anywhere on the fastener and therefore there is always a degree of guesswork before the correct spanner can be used.

It is also reasonably common to have nuts and bolts in relatively inaccessible places and it is extremely inconvenient to have to use a relatively large number of spanners in order to find the spanner which will fit the fastener head.

However, not every possible solution to this problem will find acceptance in the marketplace.

For instance, it may be possible to have a finger member (for instance a thin blade) formed with a number of centralised openings which correspond with different fastener head sizes such that the finger member can be placed over the nut to find the correct fastener size before a spanner is required. However, is not convenient to have a large number of notches on a single finger member as their may be space constraints that will not allow the finger member to be pushed further along such that the fastener can be lined up with a correct notch on the finger member. Therefore, it would be advantageous to have a plurality of finger members each with one or relatively few "notches" as this will allow the finger member to be used in confined spaces. However, if these finger members are not properly designed, it can be almost just as inconvenient to have to select from a large number of finger members as it would be to simply use a large number of spanners. Having centralised openings requires the finger member to be placed over the nut or bolt which obscures it which is not desirable.

It is also not a totally satisfactory solution to simply pin the finger members together. This is because one finger member will need to be inserted around the fastener such that the size of the fastener can be determined, but the other finger members will be in the way, can snag against adjacent equipment, and be generally inconvenient.

Therefore, there would be an advantage if it were possible to provide some form of nut and bolt sizing or gauging device or tool which could be used to size a relatively large range of bolts and nuts or similar items that need to be sized, and where this can be done in a convenient manner and therefore where the device/tool will find acceptability to the consumer.

BRIEF SUMMARY OF THE INVENTION

It is an object of the invention to provide a nut or bolt sizing tool that may overcome at least some of the above-mentioned disadvantages or provide a useful or commercial choice.

In one form, the invention resides in a nut or bolt sizing tool, the tool comprising a plurality of relatively thin finger members, at least some of the finger members being provided with a measuring slot or notch which can be used to determine the size of the nut or bolt, and identification means being provided such that the size of the slot or notch can be quite readily determined, the finger members able to move between a first position where the finger members substantially overlie each other, and a second position where a finger member can be moved to a position where it can be used to size a nut or bolt.

An advantage of this tool is that each finger member can be provided with one, two, or a relatively few number of measuring slots. This therefore makes the measurement of a nut or bolt convenient even in confined spaces.

Preferably the finger members are at least partially restrained into the first position, Another advantage is that the finger members can be "stored" or "retracted" to overlie each other or at least partially overlie each other and preferably in such a manner that they are somewhat held together and will not simply pivot away without some force needing to be applied. This is an advantage over loosely held or pinned sheet members or finger members which can dangle and be quite in the way.

Another advantage of the present invention is that it may have a particular structure such that the finger members can be returned to the stored or retracted position without tangling with the other finger members which could be a problem otherwise.

The tool can be made to be relatively compact and it is envisaged that the tool can be made such that it can be small enough to be placed in a person's pocket.

The tool may contain any convenient number of finger members. The more finger members that are provided, the more nut and bolt sizes can be determined. However, if an excessive number of finger members is provided, it may make the tool large and bulky, and, in any event, it is considered that there will be a reasonable limit on the number of sizes that are required.

It is considered that the tool may contain between 1-30 finger members and preferably between 8-25 finger members, although it is not considered that any particular limitation should be placed on the number of finger members unless the context requires otherwise.

The size and shape of the finger members can vary. Each finger member can have a length of between 30-200 mm, and it is considered most suitable that the finger members are (a) long enough such that they can be placed in awkward or inaccessible places to size a nut or bolt, but (b) not so long such that they become cumbersome or clumsy to work with, to store etc. Therefore, it is envisaged that a useful finger length may be between 50-200 mm.

It is envisaged that the finger members will all be the same or approximately the same length, but there may be an advantage in having some shorter finger members and some longer finger members.

The shape of the finger members can vary. It is considered that the shape will probably be generally elongate and somewhat rectangular when viewed in plan, but the finger members may be rounded (for instance at their ends), tapered, or have an irregular shape. There may be circumstances where the finger members (or at least some of the finger members) can be circular or quite oval with the measuring slots being provided along the periphery.

The finger members can be made of any suitable material. It is considered that the finger members will probably be made of metal such as steel, but the finger members may also be made of plastic, card, composite materials, laminate materials, plastic coated materials and the like. The members may be made of clear material such that the nuts/bolts etc. can be seen clearly.

The finger members should be relatively thin such that they can (a) be used in relatively confined or inconvenient areas and (b) can be stored in an overlapping position without the entire tool becoming too bulky or clumsy to handle.

It is envisaged that each finger member will have a thickness of between 0.5-5 mm although, unless the context provides otherwise, it is not considered that any particular limitation should be placed on the thickness of each finger member.

The finger members are preferably designed such that they can overlie each other when not required to provide a compact arrangement. When a finger member is required, it can be pushed or prised or otherwise removed from the remainder of the finger members. However, there may be an advantage in having the finger members only partially overlapping or overlying each other, or possibly having only some finger members at least partially overlapping, and others not. This may be the situation if some finger members are elongate and others are rounded.

Each (or at least most) of the finger members should contain a measuring slot to size a nut or bolt or other item that needs to be sized. The slot will typically be substantially U-shaped or C-shaped, such that the nut or bolt can pass into the slot to be measured thereby. However, the measuring slot may have other shapes. For instance, the measuring slot may be provided with a pair of spaced apart walls which are substantially parallel and which can be used to size a nut or a bolt or something else, and the remainder of the slot may have a different shape.

The slot will probably be open ended such that a nut or bolt or something else can be easily inserted into a slot such that the size of the nut/bolt etc. can be determined. However, it is also envisaged that the slot may be "closed" and therefore may comprise a rectangular, octagonal, or whatever, type opening in the finger which can extend about a nut, or a bolt etc. It is considered more convenient (for reasons described previously) to have an "open" slot or opening as opposed to a "closed" slot or opening.

It is also envisaged that the slot or opening etc. may be provided with a pair of spaced apart walls which may converge relative to each other such that the slot has a larger opening and a narrower inward or rear portion. This slot can then be placed against a nut, bolt etc. and pushed until the nut, bolt etc. is held between the opposed side walls, and then there may be provided some form of indicia or other type of identification means to advise on the nut or bolt size.

It is preferred that a finger member is provided with at least one measuring slot, and preferably a pair of slots. In this manner, a single finger member can have one slot along one edge of the finger member, and a second slot along the opposed edge of the finger member, and the finger member can then be inverted by 180° to select the required measuring slot. This can provide a greater range of sizings.

The measuring slot on a finger member will typically comprise either a "metric" and/or "imperial" measurement. The finger member may contain only metric measurements, or only imperial measurements, or a combination. Thus, a said finger member may contain a metric measuring slot on one side, and an imperial measuring slot on the other side. It may be that the metric size on the finger member is designed to approximate a corresponding imperial size on the finger member. For instance, a particular finger member may contain a "13 mm" metric slot and a ½" imperial slot on the same finger member. This will allow the user to select the closest fitting slot to determine if the nut/bolt etc. is metric or imperial. However, no particular limitation should be placed on this unless the context determines otherwise.

The metric measurements can range through any suitable range. As an example, the metric measurements may go from 8 mm-30 mm measuring slots and from ⅛"-1". It should of course be appreciated that any subset of this range can be used and the tool may be designed for a particular range of sizes or a larger range or smaller range of sizes.

The measuring slot may be positioned at any suitable place on the finger member. However, it is considered useful that the slot is adjacent an outer free end of the finger member as it seems that this will make it easier for a nut or bolt to be sized.

Some form of identification means is provided to allow the measurement slot size to be indicated such that the right spanner size can then be chosen. Various ways to do this are envisaged. In a simple manner, the "size" of the measurement slot can be written, printed, or otherwise placed at or adjacent a particular measurement slot. Alternatively, some form of colour identification may be provided. It may be possible to provide some sort of "code" to indicate the size of the measurement slot. However, it seems most convenient if the size can just be printed or written etc. next to the slot itself such that the size of the slot can be easily identified.

In another form of the invention, there is provided a means such that the finger members can be quite easily pushed or otherwise manipulated to the overlying position without tangling with each other. To explain, if the finger members are provided with measuring slots, there is a possibility that these slots will catch on each other as the finger members are moved. Therefore, in another form of the invention, there is provided some means to at least partially prevent this. In one form, the means may comprise a projection or something similar on a finger member that pushes adjacent finger members slightly away when the finger member moves to the "closed" overlapping position. It is also preferred that the finger member contains a corresponding recess or opening or something similar such that when the finger member is in the overlapping position, the projection of the finger member can be at least partially accommodated in the recess or opening on and adjacent finger member as this can keep the entire tool relatively compact when in the closed position.

The finger member may contain at least one projection, and it is envisaged that a single projection will be sufficient. However, there may be circumstances where more than one projection may work better.

In a simple form, the finger member may have the projection "punched" or otherwise formed such that one side of the finger member contains the projection and the other side contains the recess immediately behind the projection. However, there may be other configurations where the projection is not punched from the remainder of the finger member. For instance, the projection may be formed separately and attached to the finger member by any suitable means such as a spot weld, or an adhesive etc.

The positioning of the projection is preferably somewhere in a middle region across the finger member, although the projection may also be more towards one end of the finger member if desired.

The finger members may be pivotally attached relative to each other and a pivot pin or something similar can be used to achieve this. However, the finger members may also be slidingly attached relative to each other.

A housing may be provided into which and from which the finger members can move. The housing (in a simple form)

may comprise a substantially U-shaped member supporting a pivot pin to which the various finger members are attached. If desired, the pivot pin can be adjusted to provide more or less friction to the various finger members. In a simple form, the pivot pin may comprise a bolt with a nut and tightening or loosening of the nut will "clamp" the finger members together with varying forces and therefore make it easier or harder to move the finger members relative to each other.

There may also be provided a tool to provide nut or bolt sizing, the tool comprising at least two finger members which are connected to each other between their ends, each finger member having a measuring slot which may comprise an open ended slot and which may be positioned slightly inwardly from each outer end of the finger member. An example of this is illustrated in FIG. 7.

BRIEF DESCRIPTION OF THE DRAWINGS

Embodiments of the invention will be described with reference to the following drawings in which:

FIG. 3. Illustrates the same tool with only one finger member having been rotated out into the "use" position.

FIG. 4. Illustrates a plan view of an illustrative finger member.

FIG. 5. Illustrates a side view of the same finger member particularly showing the indentation.

DETAILED DESCRIPTION OF THE INVENTION

Figure 1:
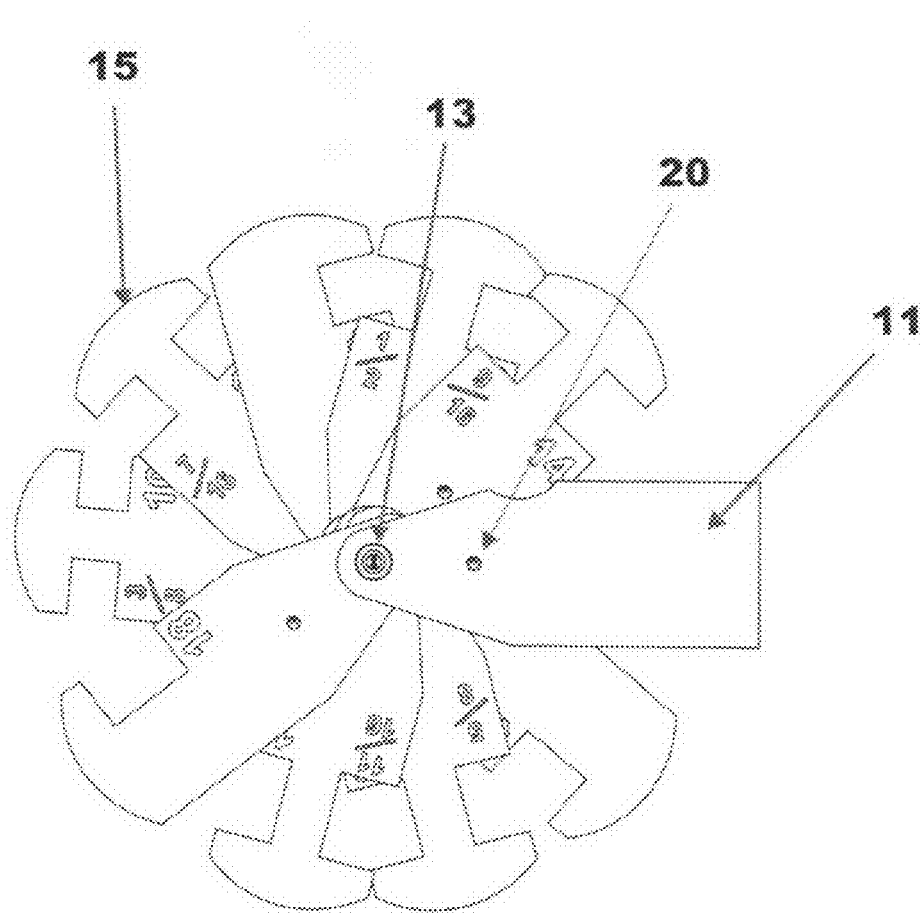
FIG. 1. Illustrates a tool with all the finger members pulled out.
Figure 2:
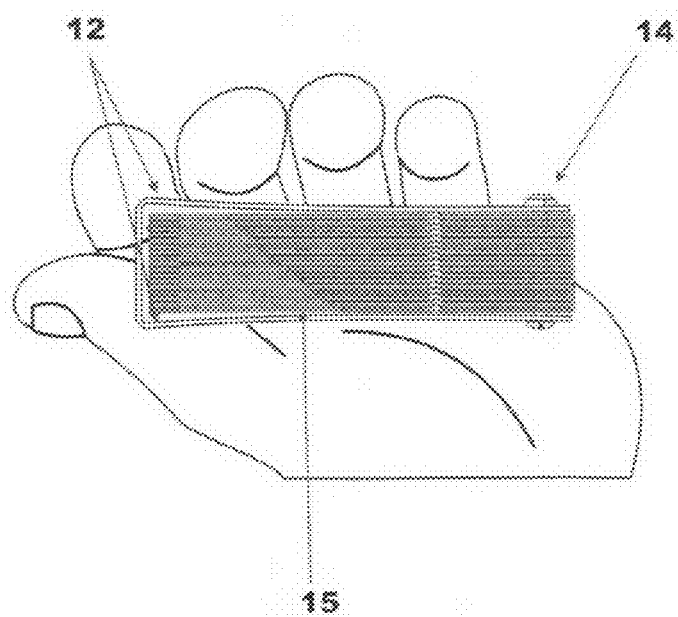
FIG. 2. Illustrates the same tool with all the finger members in the overlapping "closed" position.

Referring to the illustrations and initially to FIGS. 1-3, there is illustrated a sizing tool 10 which comprises a cover or housing 11. Cover 11 is substantially U-shaped and therefore contains a pair of spaced apart walls 12. The "free end" contains a bolt which functions as a pivot 13 and a nut 14 can be tightened on the bolt to provide various degrees of friction on the various finger members. Housed within cover 11 is a number of finger members 15. In the particular embodiment, there is provided between 10-20 finger members.

Each finger member 15 (see FIG. 3 particularly) is made of a thin, relatively stiff sheetlike material which may comprise steel, aluminium, plastic and the like. Each finger member may have a length of about 10 cm (this can of course vary) and is somewhat rectangular when viewed in plan although the particular embodiment has a curved free outer end 16, and a relatively rounded inner end 17 (the inner end being about pivot 13).

In the particular embodiment, each finger member is provided with two measuring slots 18, 19 which are provided more forwardly along the finger member and therefore more towards outer end 16. Each slot is of a particular size to provide a particular measurement. In the illustrated embodiment, one slot is metric and the other slot is imperial, although it does not appear that any particular limitation should be placed on this.

Identification means is provided to allow the slot size to be easily seen. In the particular embodiment, the identification means comprises a written or printed number or fraction to identify the slot size.

In use, the tool will initially be in the closed and compact configuration illustrated in FIG. 2. One or more finger members 15 can then be pushed out of cover 11 (see for instance FIG. 1 of FIG. 3), and can be fitted about a nut or bolt until the nut or bolt correctly sits within a particular measuring slot in which case the size of the nut or bolt can be determined. Then, a spanner can be used to manipulate the nut or bolt.

Another feature in the embodiment is a simple but clever mechanism which can allow a relatively large number of finger members to be housed within cover 11 and removed from and returned to cover 11 without tangling with each other. This is achieved by having a projection and recess on each finger member, and in the embodiment, this is best illustrated in FIGS. 4-6 as indentation 20.

Indentation 20 can be "punched" into one face of the finger member 15 to provide a projection 21 (see particularly FIG. 5) and immediately behind the projection, and on the other side of the finger member, a recess 22. The indentation 20 can be placed about midway across the finger member this being best illustrated in FIG. 4.

Figure 6:
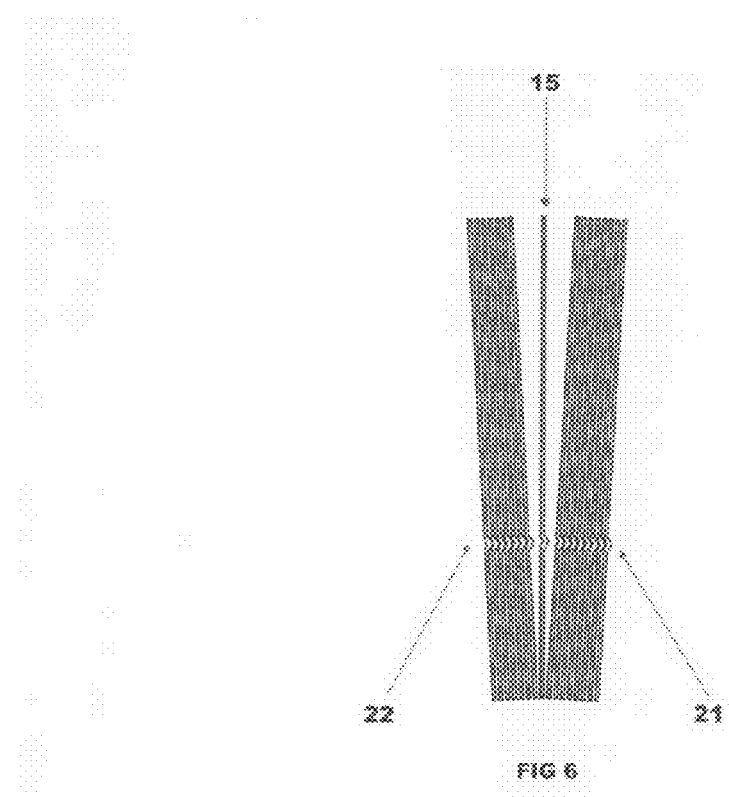
FIG. 6. Illustrates how the indentation on the finger member works to allow the finger member to be retracted to the overlapping "closed" position without catching or tangling with adjacent finger members.

FIG. 6 shows the advantage of the indentation. As a finger member is returned back into cover 11, at some stage, the projection 21 will strike an adjacent finger member and will push the finger member slightly away (see FIG. 6). By having the projection in the lower part of the finger member, this will cause the upper part of the finger member (containing the slots 18-19) to deflect away more and this can reduce the chance of the finger members becoming entangled with each other and therefore difficult to use.

When the finger member 15 (see FIG. 6) has been returned all the way back into cover 11 the projection 21 on finger member 15 will move into a corresponding recess 22 on the immediate adjacent finger member and the finger members will then return to the mainly overlapping position illustrated in FIG. 2.

Figure 7:
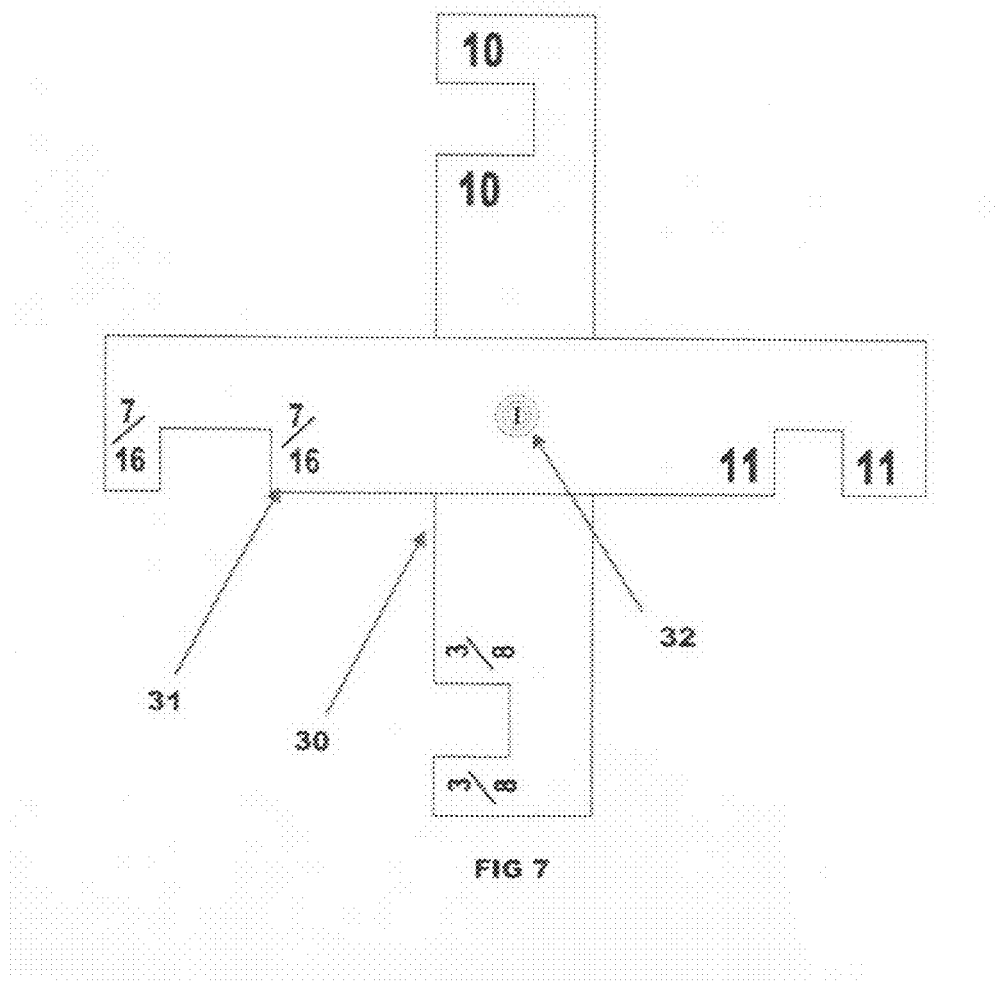
FIG. 7. Illustrates a second embodiment of the invention.

FIG. 7. Illustrates a second or alternative form or embodiment of the invention and comprises at least two finger members 30, 31 which can be pinned together substantially at the midpoint 32.

The indentations may be extremely useful in the easy and reliable use of the tool.

The tool or gauge can be used anywhere where nuts and bolts exist and there is a need to select a spanner or socket to loosen or tighten them. The tool can assist people ranging from the home handyman to the professional tradesperson to select spanners or sockets correctly the first time to avoid time-consuming, frustrating and sometimes embarrassing trips back to the toolbox.

The tool can also be used to educate and train not so skilled people to quickly and easily select a spanner or socket for the job correctly the first time thus encouraging people to learn and visualise what size spanner or socket is needed.

There is no "guesswork" or calculation in choosing spanners wall sockets which is frustrating and time-consuming. People with poor eyesight can read the figures on the finger members quite easily which is in contrast to other methods (such as using a ruler etc.).

Throughout the specification and the claims (if present), unless the context requires otherwise, the term "comprise", or variations such as "comprises" or "comprising", will be understood to apply the inclusion of the stated integer or group of integers but not the exclusion of any other integer or group of integers.

Throughout the specification and claims (if present), unless the context requires otherwise, the term "substantially" or "about" will be understood to not be limited to the value for the range qualified by the terms.

It should be appreciated that various other changes and modifications can be made to any embodiment described without departing from the spirit and scope of the invention.

The invention claimed is:

1. A tool for nut or bolt sizing, the tool comprising a plurality of relatively thin finger members, at least some of the finger members being provided with a measuring slot or notch which can be used to determine the size of the nut or bolt, and identification means being provided such that the size of the slot or notch can be quite readily determined, the finger members able to move between a first position where the finger members substantially overlie each other, and a second position where a finger member can be moved to a position where it can be used to size a nut or bolt, at least some of the finger members being provided with two separate slots, one slot being a metric size and the other slot being an imperial size which is close to the metric size, the finger members being at least partially restrained into the first position by a projection on one side of the finger member and a recess on the other side of the finger member, whereby the projection on one finger member engages with the recess on an adjacent finger member when in the first position to restrain the finger members into the first position, the projection also functioning to facilitate movement of the finger member into the first position by the projection on one finger member contacting and deflecting away an adjacent finger member upon movement of the one finger member into the first position.

2. The tool as claimed in claim 1, wherein the slot is open ended.

3. The tool as claimed in claim 2, comprising between 5-30 finger members.

4. The tool as claimed claim 3, wherein the measuring slots are on opposed longitudinal edges of the finger member.

5. The tool as claimed in claim 4, wherein the measuring slot is substantially U-shaped in configuration.

6. The tool as claimed in claim 5, wherein the measuring slot is positioned substantially at the end of the finger member.

7. The tool as claimed in claim 1, wherein the projection is on one side of the finger member and the recess is on the other side of the finger member, the recess being immediately behind the projection.

8. The tool as claimed in claim 7, wherein the projection is about midway across the finger member and in the lower half of the finger member.

9. The tool as claimed in claim 1, wherein at least some and preferably all the finger members are pivotally connected relative to each other about a pivot pin.

10. The tool as claimed in claim 8, including a cover between which the finger members can be stored.

11. The tool as claimed in claim 10, wherein the pivot pin comprises a bolt extending through the cover and including a nut to allow the degree of friction between the finger members to be adjusted by tightening or loosening the nut about the bolt.

* * * * *